Figure 1:
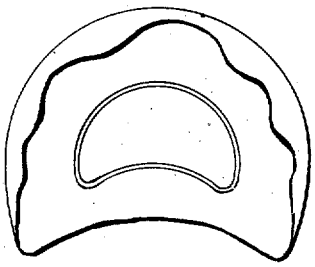
Figure 2:
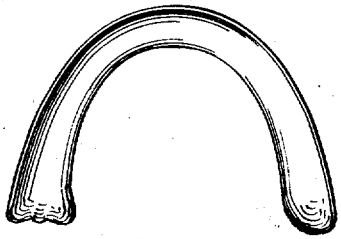

D. M. LAMB.

Dental-Plate.

No. 6,634.

Reissued Sept. 7, 1875.

WITNESSES

J. Schreitter

F. E. Smith

INVENTOR

Daniel M. Lamb

By Knight Bros Attorneys

N. PETERS, PHOTO-LITHOGRAPHER, WASHINGTON, D. C.

BEST AVAILABLE COPY

UNITED STATES PATENT OFFICE.

DANIEL MARTIN LAMB, OF LONDON, CANADA.

IMPROVEMENT IN DENTAL PLATES.

Specification forming part of Letters Patent No. 159,687, dated February 9, 1875; reissue No. 6,634, dated September 7, 1875; application filed May 26, 1875.

DIVISION B.

*To all whom it may concern:*

Be it known that I, DANIEL MARTIN LAMB, of London, in the Province of Ontario, Canada, have invented and produced a new Vulcanite for the Manufacture of Dental Plates, and for other purposes, of which the following is a specification:

The new vulcanite to which my invention relates is produced by combining with common caoutchouc, or other known vulcanizable gum, the inspissated juice of milkweed, together with sulphur or any known equivalent or substitute for sulphur as a necessary constituent of vulcanite.

My improvement is based on the discovery that vulcanite of superior quality and of less cost can be produced by mixing with ordinary india-rubber the inspissated juice of a plant of the asclepias or milkweed family, and vulcanizing the mixed or compound gum in the manner now practiced with india-rubber.

The accompanying drawings represent upper and lower dental plates of common form, to either of which my invention is applicable.

In order to obtain the milkweed-juice in proper condition for use in carrying out my invention I employ processes set forth in Letter Patent heretofore granted to me and numbered 140,281, 140,282, 144,622, and 144,623, or either of them, as may be necessary. The vulcanizable gum thus produced from milkweed-juice is mixed with ordinary india-rubber in any proportions preferred while both are in their green state, sulphur or any known and suitable substitute therefor being added in the customary manner. Seventy-five or eighty per cent. of the inspissated juice of milkweed is thus combined with common india-rubber with good effect, the quality of the vulcanite for all, or nearly all, purposes being much improved, while its cost is greatly reduced.

The improved compound vulcanite is well adapted for the manufacture of dental plates. It is cooler than vulcanite made in the usual manner of common india-rubber, and is also less offensive, either in taste or smell, and less liable to be acted on chemically by the saliva.

The improved vulcanite is harder, stronger, and more durable than that in common use, and, being capable of bearing a higher degree of heat without injury, it is less liable to destruction in the process of vulcanization.

The following is claimed as new:

A dental plate constructed of a vulcanized compound of the inspissated juice of a plant of the asclepias or milkweed family, and caoutchouc or other vulcanizable gum, and sulphur or its equivalent.

D. M. LAMB.

Witnesses:
OCTAVIUS KNIGHT,
CHAS. J. GOOCH.